(12) United States Patent
Ray et al.

(10) Patent No.: US 9,285,546 B2
(45) Date of Patent: Mar. 15, 2016

(54) CONDUIT FOR PASSING A PLURALITY OF FIBER OPTIC CABLES THROUGH A FIBER OPTIC CASSETTE SHELF

(71) Applicant: All Systems Broadband, Inc., Livermore, CA (US)

(72) Inventors: Craig Dwayne Ray, Fuquay-Varina, NC (US); Donald James Gross, Raleigh, NC (US); Timothy W. Dexter, Kent, WA (US)

(73) Assignee: All Systems Broadband, Inc., Livermore, CA (US)

( * ) Notice: Subject to any disclaimer, the term of this patent is extended or adjusted under 35 U.S.C. 154(b) by 104 days.

(21) Appl. No.: 14/295,897

(22) Filed: Jun. 4, 2014

(65) Prior Publication Data

US 2015/0355412 A1    Dec. 10, 2015

(51) Int. Cl.
*G02B 6/00* (2006.01)
*G02B 6/36* (2006.01)

(52) U.S. Cl.
CPC ........................................ *G02B 6/36* (2013.01)

(58) Field of Classification Search
USPC .......................................................... 385/135
See application file for complete search history.

(56) References Cited

U.S. PATENT DOCUMENTS

| | | | |
|---|---|---|---|
| 6,353,696 B1 | 3/2002 | Gordon et al. | |
| 6,445,865 B1 | 9/2002 | Janus et al. | |
| 6,535,681 B2 | 3/2003 | Daoud et al. | |
| 6,845,206 B2 | 1/2005 | Dwyer et al. | |
| 7,043,130 B2 * | 5/2006 | Ng | G02B 6/4459 385/135 |
| 7,059,895 B2 | 6/2006 | Murano | |
| 7,259,325 B2 | 8/2007 | Pincu et al. | |
| 7,345,239 B2 | 3/2008 | Tousignant et al. | |
| 7,601,922 B2 | 10/2009 | Larsen et al. | |
| 7,627,224 B1 | 12/2009 | Cassidy et al. | |
| 7,664,362 B2 | 2/2010 | Douglas et al. | |
| 7,672,561 B1 | 3/2010 | Keith et al. | |
| 7,734,139 B2 | 6/2010 | Rector, III | |
| 8,119,915 B2 | 2/2012 | Regester et al. | |
| 8,143,521 B2 | 3/2012 | Burek et al. | |
| 8,256,723 B2 | 9/2012 | Rapp et al. | |
| 8,457,464 B2 | 6/2013 | O'Connor | |
| 2010/0272409 A1 | 10/2010 | Sjodin | |
| 2011/0299822 A1 | 12/2011 | Barry et al. | |

* cited by examiner

*Primary Examiner* — Eric Wong
(74) *Attorney, Agent, or Firm* — Murphy, Bilak & Homiller, PLLC (57) ABSTRACT

A conduit for passing fiber optic cables through a fiber optic shelf includes a floor section and two sidewalls joining opposing sides of the floor extending towards a top of the conduit. The sidewalls and floor form a u-shaped enclosure having an opening at the top. A fastening anchor having a first tab joins the floor and extends away from the top perpendicular to the floor. A fastener perforation on the first tab is dimensioned to receive a fastener for affixing a fiber optic cassette to a fiber optic shelf. An engagement anchor joins the floor at an opposite end from the fastening anchor and extends away from the top. A protrusion on the engagement anchor extends towards the first tab so as to engage a fastener perforation of a mounting rail in the fiber optic shelf and secure the conduit to the mounting rail.

17 Claims, 10 Drawing Sheets

CONDUIT FOR PASSING A PLURALITY OF FIBER OPTIC CABLES THROUGH A FIBER OPTIC CASSETTE SHELF

TECHNICAL FIELD

The present invention generally relates to fiber optical networks, and particularly relates to conduit structures used to efficiently accommodate a number of fiber optic cables in a high density fiber optic shelf.

BACKGROUND

Today's communication networks provide transport of voice, video and data to both residential and commercial customers, with more and more of those customers being connected by fiber optic cables. In these communication networks, information is transmitted from one location to another by sending pulses of light through the fiber optic cables. Fiber optic transmission provides several advantages over electrical transmission techniques, such as increased bandwidth over distance with lower losses and maintenance.

Designers and installers of fiber optic networks are often confronted with significant space constraints that restrict the design of the network. In particular, terminations of fiber optic cabling (e.g., between the service provider and customer) require a dedicated space to accommodate and protect the terminations. In some instances, the space available for a termination point may be limited to relatively small cabinets, data centers and storage area networks. These small spaces are sometimes ill-suited to accommodate the high number of fiber optic terminations associated with modern, high-bandwidth networks. Consequently, network designers are constantly seeking ways to optimize the space-efficiency of termination points.

High density fiber optic cassette systems have evolved as one solution to provide space-efficient fiber optic terminations. Fiber optic cassettes are standardized modules having a number of ports that are complementary to a standardized endpoint structure of fiber optic cables. These ports provide a plug-and-socket functionality that allows an installer to easily effectuate multiple terminations in an efficient, organized array. Fiber optic cassettes may be mounted in a high-density fiber optic shelf. These shelves have internal mounting rails arranged such that the cassettes can be mounted in a horizontal array with front sides of the cassettes facing an open side of the shelf. This provides easy access to the cassette ports, allowing the installer to effectuate the terminations.

Fiber optic cassette shelves may be designed to include multiple sets of mounting rails so as to accommodate multiple arrays of fiber optic cassettes. This design requires easy access to the front sides of the fiber optic cassettes in each array. Particularly as the shelf approaches maximum capacity, the amount of available space to route cabling and to make terminations with the fiber optic cassettes may be limited. Furthermore, the fiber optic cabling may have to be distributed around the fiber optic cassettes. There may be little space available for the fiber optic cables and it may be challenging to maintain organization of the fiber optic cables.

SUMMARY

According to an embodiment, a conduit for passing fiber optic cables through a fiber optic shelf is disclosed. The conduit includes an elongated floor section and first and second generally planar sidewalls joining the floor section at opposite facing sides and extending away from the floor towards a top of the conduit. The first and second sidewalls and the floor section form a u-shaped enclosure having an opening at the top. The conduit further includes a fastening anchor having a first tab joining the floor section at a first end and extending away from the top to form a substantially perpendicular angle with the floor section. The first tab has a fastener perforation dimensioned to receive a fastener for affixing a fiber optic cassette to fiber optic shelf. The conduit further includes an engagement anchor joining the floor section at a second end that is opposite the first end and extending away from the top. The engagement anchor has a protrusion extending towards the first tab so as to engage a fastener perforation of a mounting rail in the fiber optic shelf and secure the conduit to the mounting rail.

According to another embodiment, a system for mounting a plurality of fiber optic cassettes to a fiber optic shelf and for routing a plurality of fiber optic cables in the shelf between opposite facing fiber optic cassettes is disclosed. The system includes a fiber optic shelf. The fiber optic shelf includes a first mounting rail arranged in the shelf such that a first planar mounting surface faces a first opening of the of the fiber optic shelf. A second mounting rail is arranged in the shelf spaced apart from the first mounting rail such that a second planar mounting surface faces a second opening of the fiber optic shelf that is opposite the first opening. The first and second planar mounting surfaces each comprise an array of shelf fastener perforations being dimensioned to receive a cassette fastener for affixing a fiber optic cassette against the mounting surface. The system further includes a conduit. The conduit includes an elongated floor section and first and second generally planar sidewalls joining the floor section at opposite facing sides and extending away from the floor towards a top of the conduit. The first and second sidewalls and the floor section form a u-shaped enclosure having an opening at the top. A fastening anchor having a first tab joins the floor section at a first end and extends away from the top to form a substantially perpendicular angle with the floor section. The first tab includes a fastener perforation dimensioned to receive a fastener for affixing a fiber optic cassette to a fiber optic shelf. The conduit further includes an engagement anchor joining the floor section at a second end that is opposite the first end and extending away from the top. The engagement anchor has a protrusion extending towards the first tab so as to engage a fastener perforation of a mounting rail in the fiber optic shelf and secure the conduit to the mounting rail.

BRIEF DESCRIPTION OF THE DRAWINGS

FIG. 1, including

FIG. 2, including

FIG. 3, including

FIG. 4, including

FIG. 5, including

FIG. 6, including

DETAILED DESCRIPTION

Embodiments described herein relate to fiber optic shelves having two opposite facing open sides that provide access to two different mounting rails arranged within the shelf. The mounting rails may be configured to accommodate the installation of fiber optic cassettes. Fiber optic cassettes can affixed to the respective mounting rails such that different sets of the cassettes face t towards the opposite facing open sides. That is, two arrays of fiber optic cassettes can be arranged so that front sides of the fiber optic cassette face outwards towards the open sides and so that that rear sides of the fiber optic cassettes in each array face inwards towards one another. This arrangement makes efficient use of the space within the fiber optic shelf while allowing the ports of the fiber optic cassettes to be easily accessible by an installer. However, such a high-density arrangement of cassettes correspondingly requires adequate space for the fiber optic cables. Furthermore, installers may need to route some of the fiber optic cabling through the shelf (i.e. through the opposite facing arrays of cassettes).

A conduit structure is disclosed that is used in conjunction with the fiber optic shelf to provide a dedicated channel for the routing of fiber optic cables through the shelf. Consequently, fiber optic cabling that is easily accessible from one side of the shelf can be routed through the cassettes shelf to be accessible on an opposite side of the shelf. Further, the high volume of fiber optic cables associated with terminations to each of the cassettes can be organized efficiently within the shelf. The conduit is dimensioned to be placed across the mounting rails to occupy space that could otherwise be occupied by fiber optic cassettes. Similar or identical fasteners as those used to affix the fiber optic cassettes to the shelf can be used to secure the conduit to the shelf. The conduit is rounded off at perimeter edges so that fiber optic cables do not catch on an abrupt corner. Further, the conduit includes retaining features to ensure that the cabling stays within the dedicated channel space.

FIG. 1 depicts an embodiment of a conduit 100 that may be installed in a fiber optic shelf to provide a dedicated channel for the routing of fiber optic cables through the shelf. FIG. 1A depicts the conduit 100 from a side-view perspective and FIG. 1B depicts the conduit 100 from a diagonal-view perspective. FIG. 1C depicts the conduit 100 from a front-view perspective and FIG. 1D depicts the conduit 100 from a top-down perspective.

The conduit 100 has an elongated floor section 102. A first end 104 of the floor section 102 is spaced apart from an opposite facing second end 106 of the floor section 102. Opposite facing sides 108 of the floor section 102 extend between the first and second ends 104, 106. Two generally planar sidewalls 110 join the floor section 102 at the opposite facing sides 108 and extend away from the floor section 102 towards a top 112 of the conduit 100.

The sidewalls 110 and the floor section 102 collectively form a u-shaped enclosure having an opening at the top 112 of the conduit 100. A U-shaped enclosure describes a structure that partially surrounds an interior space, but does not necessarily completely surround the interior space. As shown, the floor section 102 and sidewalls 110 provide a u-shaped enclosure that surrounds an interior space in three directions, with the top of the enclosure partially opened. The bottom of a u-shaped enclosure as described herein is not necessarily curved.

Figure 1A:
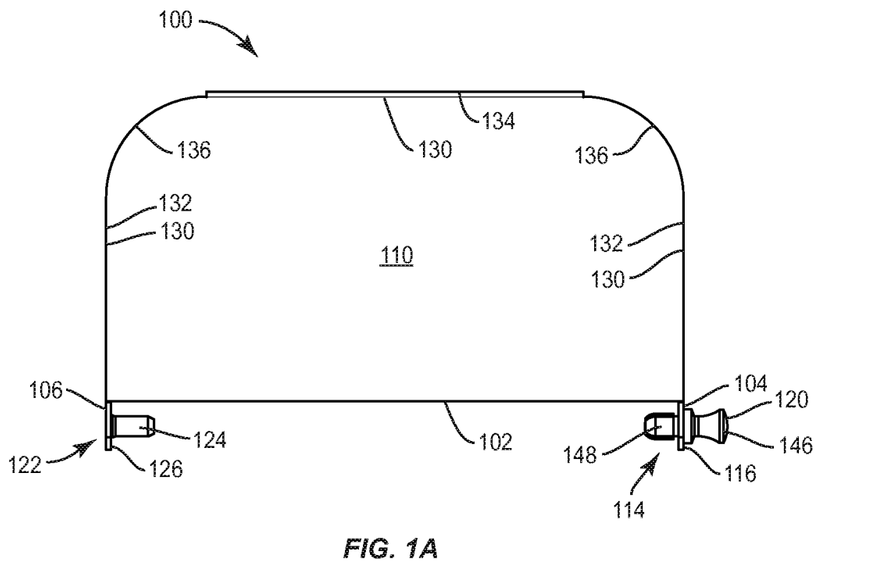
FIGS. 1A, 1B, 1C, and 1D, depicts a conduit for passing fiber optic cables through a fiber optic cassette side-view, diagonal-view, front-view and top-down-view perspectives, according to an embodiment.
Figure 1B:
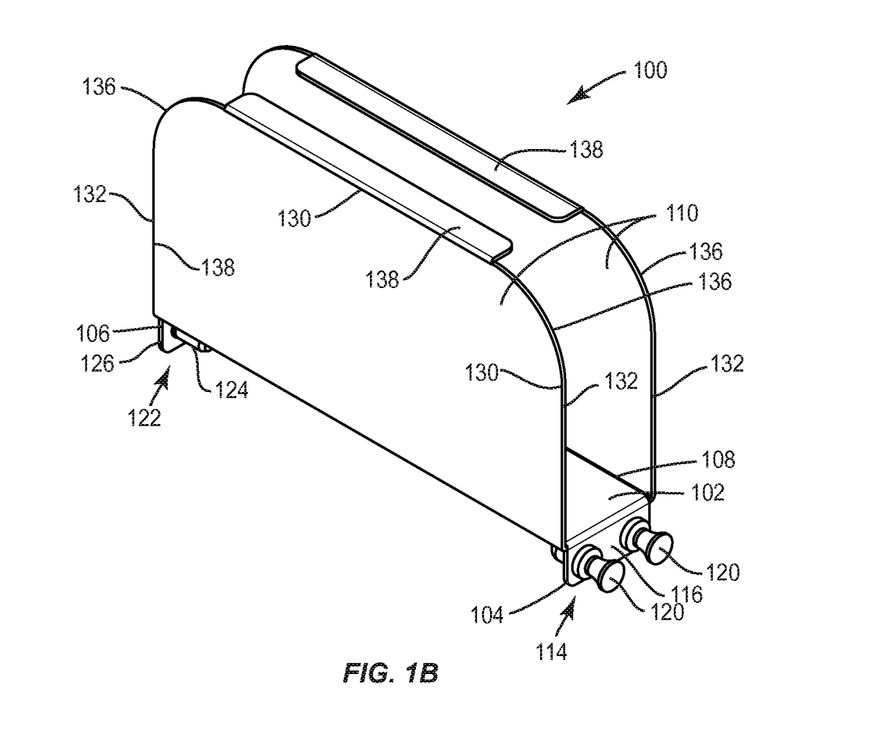
Figure 1C:
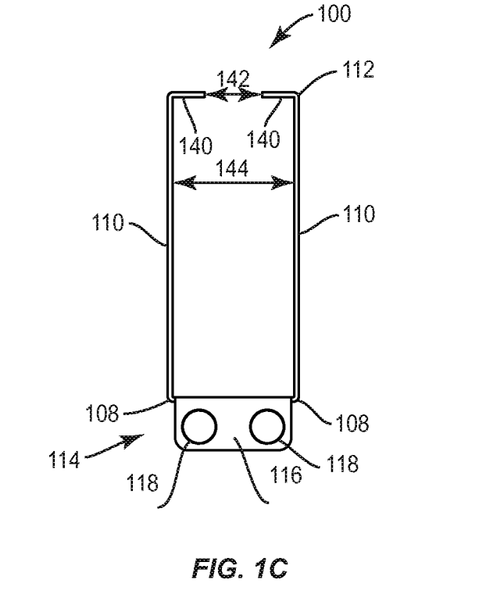
Figure 1D:
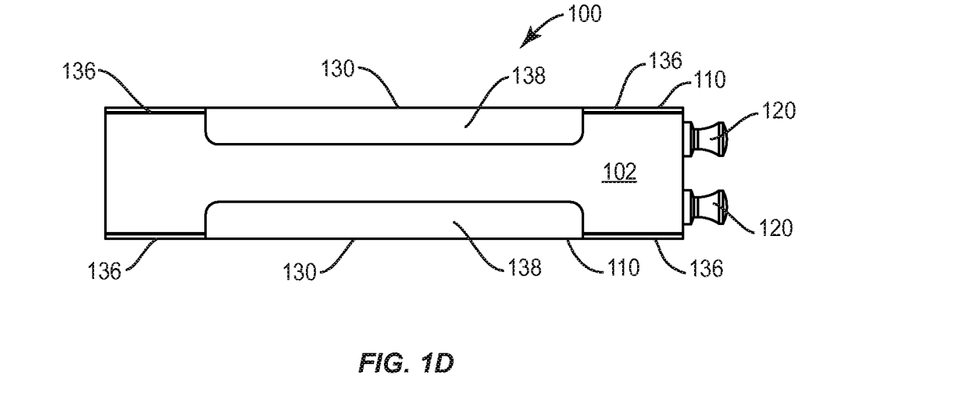

As shown in the front-view perspective of FIG. 1C, the sidewalls 110 may form a substantially perpendicular angle with the floor section 102. Alternatively, the sidewalls 110 may be inclined with respect to the floor section 102. For example, the sidewalls 110 may extend towards or away from one another as the sidewalls 110 extend away from the floor section 102. That is, the sidewalls 110 may be spaced closer or further from one another at the top 112 than at the floor 102.

A fastening anchor 114 joins the floor section 102 at the first end 104. The fastening anchor includes 114 a first tab 116 that joins the floor section 102 and extends away from the top 112. That is, the first tab 116 extends away from the floor section 102 in an opposite direction as the sidewalls 110. The first tab 116 may form a substantially perpendicular angle with the floor section 102. Further, the first tab 116 may be substantially perpendicular to the sidewalls 110.

The first tab 116 includes a fastener perforation 118 dimensioned to receive a fastener 120 for affixing a fiber optic cassette to a fiber optic shelf. Exemplary fasteners 120 include push-pins, screws, nuts, and bolts. The fasteners 120 depicted in the figures are push-pins, and will be described in further detail below. Common diameters of push-pins are in the range of 4 to 10 millimeters, and more particularly may be 4.7 mm, 6.35 mm or 7.95 mm, for example. The fastener perforation 118 is correspondingly dimensioned so that the fastener 120 may be inserted in the perforation 118 without substantial resistance.

An engagement anchor 122 joins the floor section 102 at the second end 106 of the floor section 102 and extends away from the top 112. The engagement anchor 122 is arranged opposite the fastening anchor 114. The engagement anchor 122 includes a protrusion 124 that extends towards the first tab 116 so as to engage a fastener perforation of a mounting rail in a fiber optic shelf and secure the conduit 100 to the mounting rail. The protrusion 124 engages a fastener perforation of a mounting rail by extending through the fastener perforation so that the movement of the conduit 100 at the second end is restricted. While engaged, the movement of the floor section 102 at the second end 106 with respect to the mounting rail to which the protrusion 124 extends through is substantially restricted. That is, the conduit 100 can be slid in and out of the fastener perforation, and may be pivoted around the mounting rail to which the protrusion 124 extends through, but the second end 106 cannot be moved in a direction parallel to the extension of the sidewalls 110.

In the embodiment of FIG. 1, the engagement anchor 122 is formed by a second tab 126 joining the floor section 102 at the second end 106 and extending away from the top 112 to form a substantially perpendicular angle with the floor section. As a result, the conduit 100 comprises first and second tabs 126 arranged opposite sides 104, 106 of the floor section 102 that face one another. The protrusion 124 is perpendicular to the second tab 126 such that the protrusion extends towards the first tab 114 in a direction substantially parallel to the floor section 102.

Figure 2A:
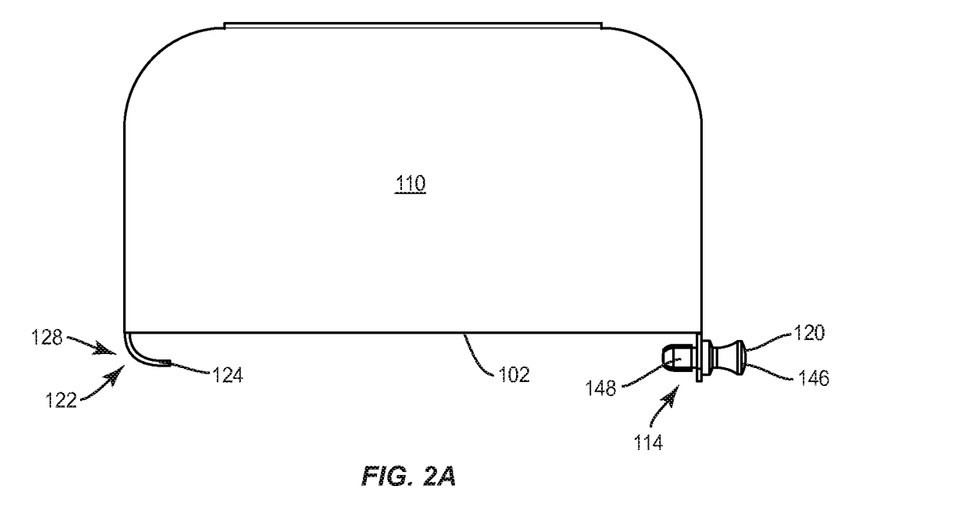
FIGS. 2A and 2B, depicts a conduit for passing fiber optic cables through a fiber optic shelf from side-view and diagonal-view perspectives, according to another embodiment.
Figure 2B:
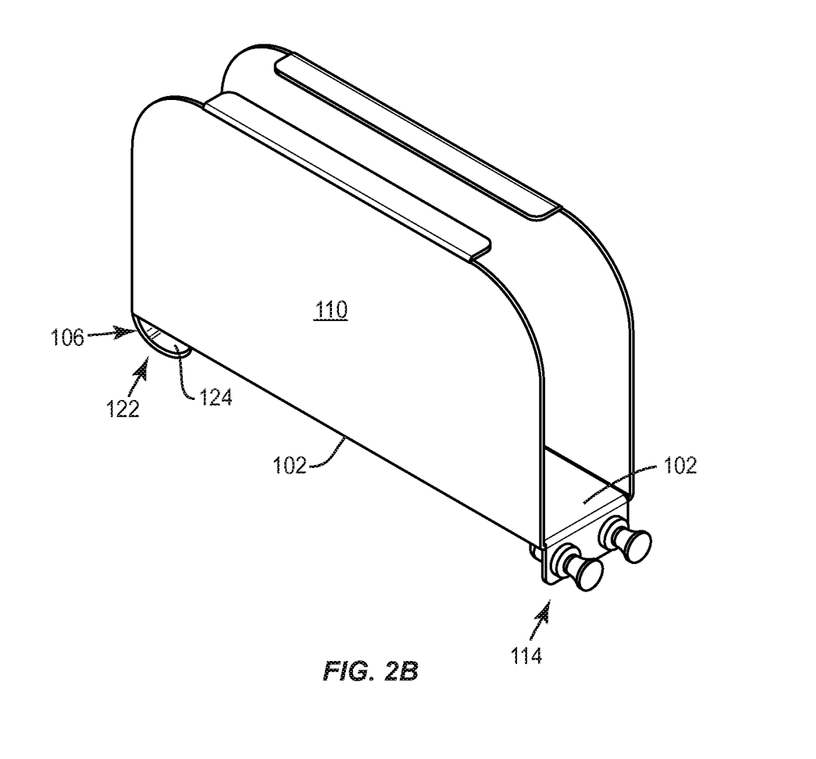

FIG. 2 depicts an alternate embodiment of the engagement anchor 122. The conduit 100 is shown from a side-view perspective in FIG. 2A and from a diagonal-view perspective in FIG. 2B. The conduit 100 is substantially similar to the conduit 100 depicted in FIGS. 1-2, except for the configuration of the engagement anchor 122. The engagement anchor 122 has a curved surface 128 joining the floor section at the second end 106 and curving towards the first tab 114. The protrusion 124 is arranged at an end of the curved surface 128 and extends towards the first tab 114 in a direction substantially parallel to the floor section 102. In contrast to the embodiment of FIG. 1, the engagement anchor 122 of FIG. 2 does not include a tab extending substantially perpendicular to the floor section 102.

The sidewalls 110 of the conduit 100 have a perimeter 130 that includes two side edges 132 and a top edge 134. The side edges 132 adjoin the floor section 102 and extend towards the top 112 in a direction substantially perpendicular to the floor section 102. The side edges 132 may be coplanar with the first tab 116 of the fastening anchor 114. The top edge 134 extends in a direction substantially parallel to the floor section 102. Thus, the side edges 132 would form perpendiculars corner with the top edge 134, if the two edges 132, 134 were extended into one another. According to an embodiment, the perimeter 130 includes two curved edges 136 arranged so that the side edges 132 do not form a perpendicular corner with the top edge 134. Each one of the curved edges 136 extends from one of the side edges 132 to the top edge 134. Thus, the perimeter 130 does not have any abrupt corners.

According to an embodiment, the conduit 100 includes a pair or retaining features 138 to prevent fiber optic cables placed within the u-shaped enclosure from escaping the conduit 100. The retaining features 138 are separated from one another by a separation distance 142. This separation distance 142 is less than a maximum separation distance 144 between the sidewalls 110. That is, the retaining features 138 are arranged opposite one another at corresponding locations such that the U-shaped enclosure narrows at the top 112 of the conduit 100.

According to an embodiment, the retaining features 138 include generally planar surfaces 140 that are substantially parallel to the floor section 102. Further, the retaining features 138 may adjoin the top edge 134 and extend along the entire top edge 136 (i.e. from one of the curved edges 136 to another). Alternatively, the retaining features 138 may be arranged beneath the top edge 134, closer to the floor.

Figure 3A:
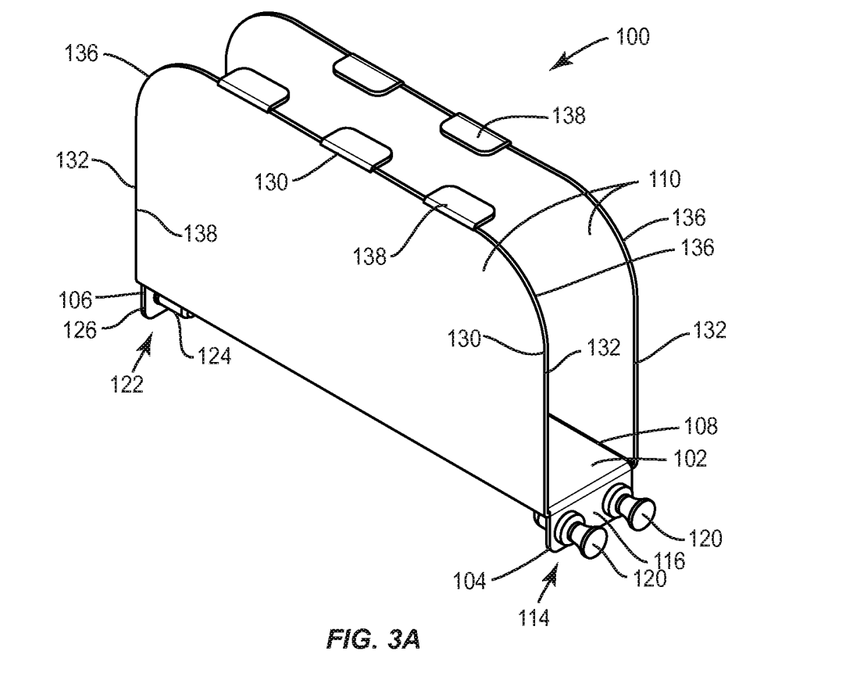
FIGS. 3A and 3B, depicts a conduit for passing fiber optic cables through a fiber optic shelf from diagonal-view and top-down-view perspectives, according to another embodiment.
Figure 3B:
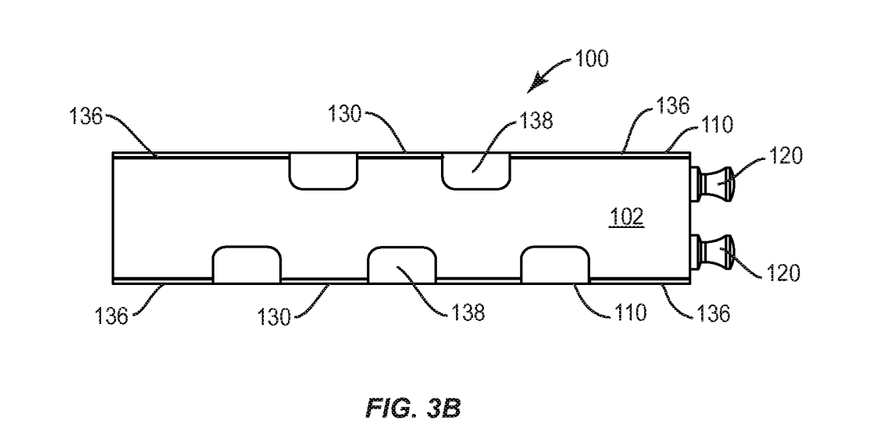

FIG. 3 depicts an alternate embodiment of the retaining features 138. The retaining features 138 shown in FIGS. 3A and 3B do not extend along the entire top edge 136. Instead a plurality of retaining features 138 are formed on each of the top edges 136 such that the retaining features 138 are spaced apart from one another in a direction parallel to the top edge. Further, the plurality retaining of features 138 in the plurality extending way from one of the sidewalls 110 are offset from the plurality retaining of features 138 in the plurality extending way from an opposite facing one of the sidewalls 110. That is, the retaining features 138 in FIGS. 3A and 3B are configured as offset teeth.

The separation distance 142 between the retaining features 138 and the maximum separation distance 144 between the sidewalls 110 are measured along a line parallel to the floor and perpendicular to the faces of the sidewalls 110, as shown in the front-view perspective of FIG. 1C. The separation distance 142 between the pair of retaining features 138 should be sufficiently wide enough to allow for easy placement of fiber optic cables in the conduit 100. That is, there should be a sufficient gap between the retaining features 138 so that a number of fiber optic cables can be placed in the conduit 100 space with relative ease. However, the retaining features 138 should sufficiently narrow the top 112 of the conduit 100 to contain a number of fiber optic cables within the enclosure. According to an embodiment, the separation distance 142 between the retaining features 138 is less than 50% of a maximum separation distance 144 between the sidewalls 110.

Figure 4A:
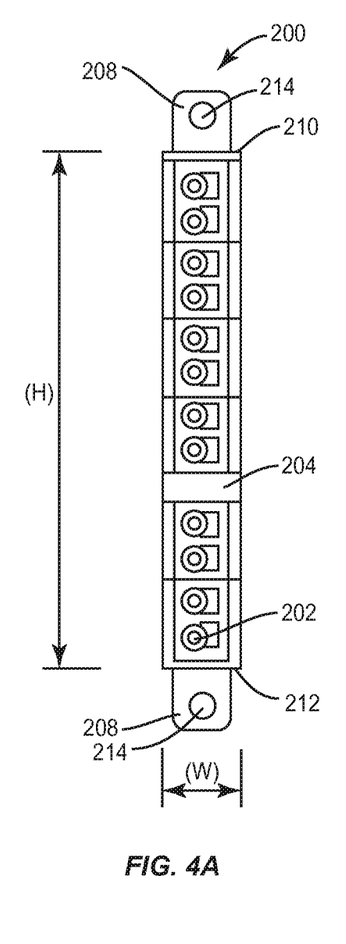
FIGS. 4A and 4B, depicts a front-view and side-view perspective of a fiber optic cassette that may be used to provide fiber optic terminations, according to an embodiment, according to an embodiment.
Figure 4B:
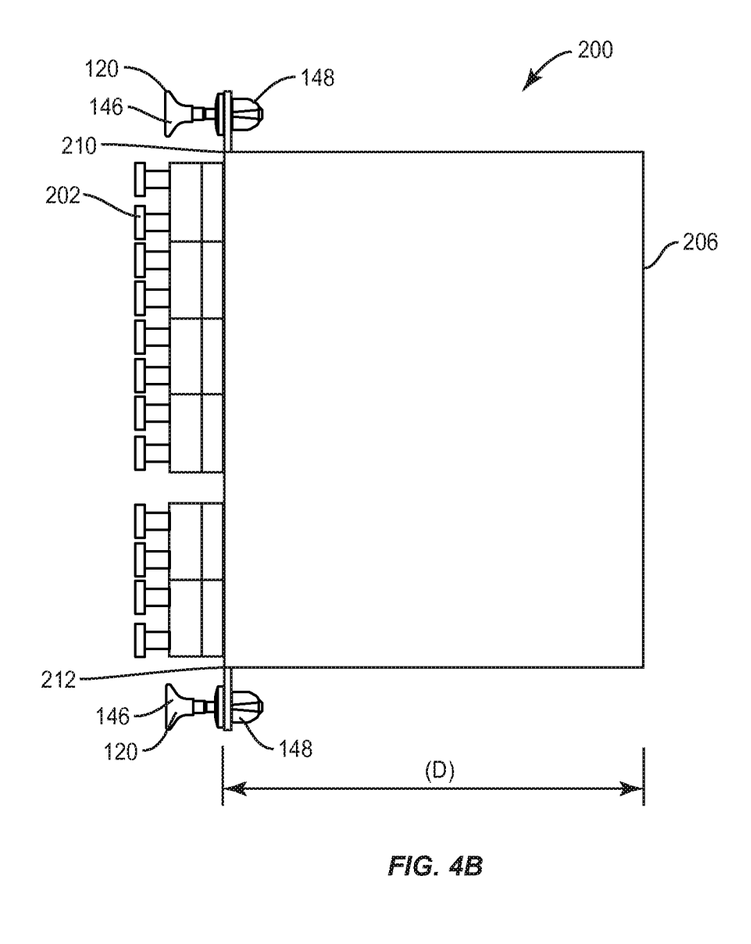

FIG. 4 depicts a fiber optic cassette 200 that may be used in a system for high-density fiber optic terminations, according to an embodiment. FIG. 3A depicts the cassette 200 from a front-view perspective and FIG. 3B depicts the cassette 200 from a side-view perspective. Fiber optic ports 202 are arranged in a vertical array on a front side 204 of the cassette 200. A rear side 206 of the cassette 200 faces opposite from the front side 204. FIG. 4 depicts a height (H), a width (W) and a depth (D) of the cassette 200. Two tabs 208 extend from a top 210 and bottom 212 of the fiber optic cassette 200 at the front side 204. The tabs 208 include cassette fastener perforations 214 dimensioned to receive a fastener 120 for affixing the fiber optic cassette 200 to a fiber optic shelf. The cassette fastener perforations 214 may be dimensioned in the same manner as the fastener perforations 118 arranged on the first tab 116 of the conduit 100, as previously discussed. The side-view representation of FIG. 4B depicts push-pin style cassette fasteners 120 arranged in the cassette fastener perforations 214.

Figure 5A:
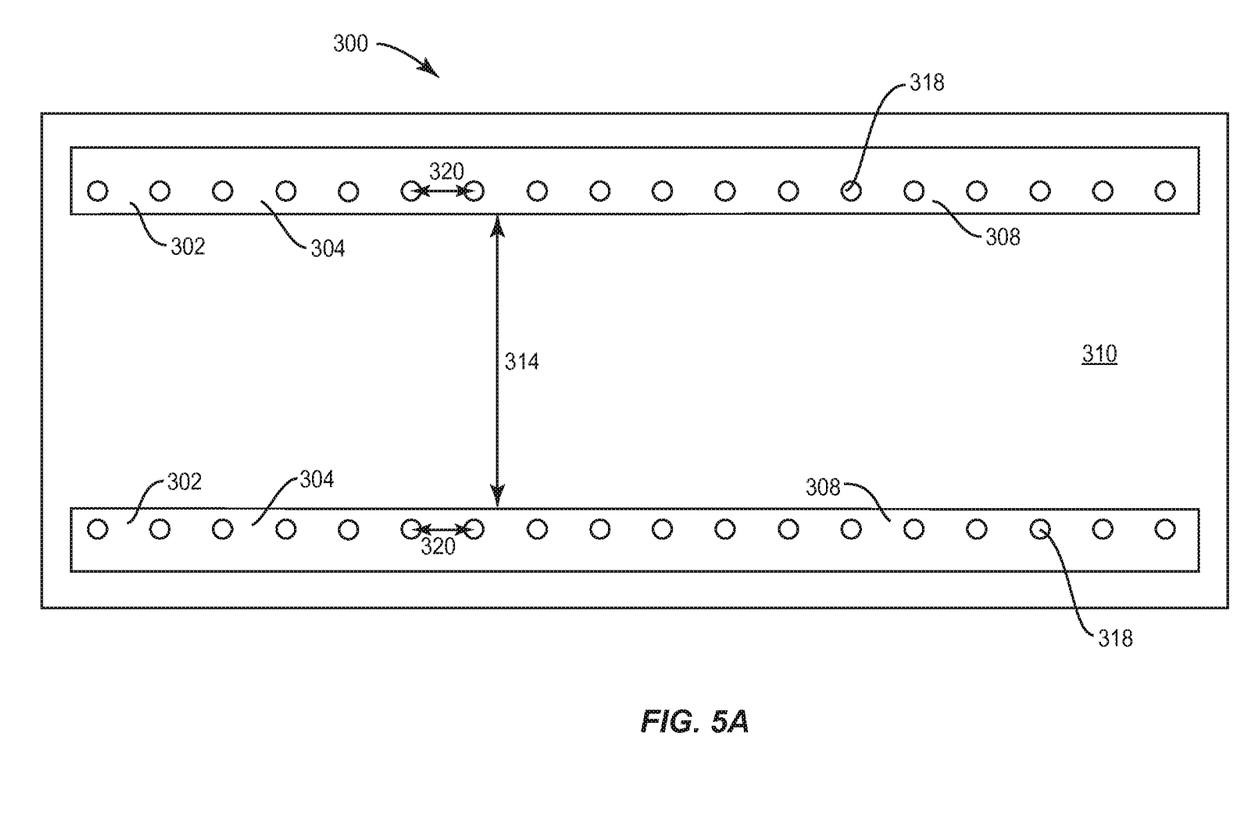
FIGS. 5A and 5B, depicts a fiber optic shelf that accommodates fiber optic cassettes and a conduit, according to an embodiment.
Figure 5B:
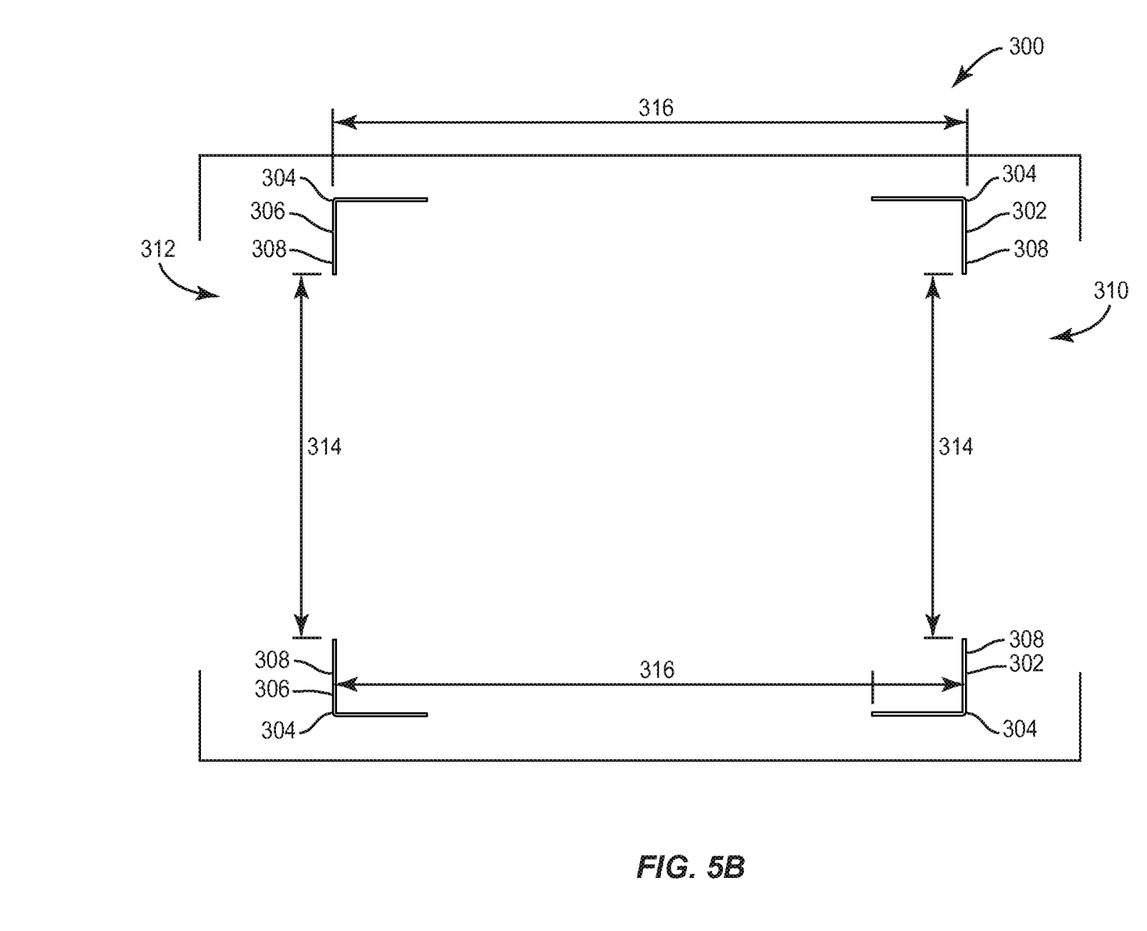

FIG. 5 depicts a fiber optic shelf 300 that may be used in a system for high-density fiber optic terminations, according to an embodiment. FIG. 5A depicts the shelf 300 from a front-view perspective and FIG. 5B depicts the shelf 300 from a side-view perspective. The conduit 100 of FIGS. 1-3 and the fiber optic cassette 300 of FIG. 4 may be installed in the fiber optic shelf 300. The fiber optic shelf 300 includes a first pair 302 of mounting rails 304 spaced apart from a second pair 306 of mounting rails 304 (not shown in FIG. 5A). The rails 304 in the first pair 302 have a planar mounting surface 308 facing a first open side 310 of the shelf 300. The rails 304 in the second pair 302 have a planar mounting surface 308 facing a second open side 312 of the shelf 300 that is opposite the first open side 310. That is, the mounting rails 304 are arranged in the shelf 300 so that at least two mounting surfaces 308 face away from one another, towards the first and second open sides 310, 312. A vertical distance 314 separating both the first and second pairs 302, 306 of mounting rails 304 corresponds to the height (H) of the fiber optic cassettes 200. The vertical distance 314 may be the identical to or slightly larger than the height (H) of the fiber optic cassettes 200 so that the cassettes 200 can be inserted between the rails 304 until both tabs 208 of the fiber optic cassettes 200 are flush with the mounting surfaces 308. A lateral distance 316 separating mounting rails 304 in the first pair 302 from corresponding mounting rails 304 in the second pair 302 correlates to the depth (D) of the fiber optic cassettes 200. For instance, the lateral distance 316 may be twice the depth (D) of the fiber optic cassettes 200, plus an additional distance for maneuverability (e.g. 2 cm). This lateral distance 316 allows fiber optic cassettes 200 to be mounted to both pairs 302, 306 of mounting rails 304 and provides marginal space to maneuver the fiber optic cassettes 200.

The mounting surface 308 on the first and second pair 302, 306 of mounting rails 304 includes an array of shelf fastener perforations 318 dimensioned to receive a cassette fastener 120 for affixing the fiber optic cassette 200 against the mounting surface 308. The diameter of the shelf fastener perforations 318 may be identical or nearly identical to the diameter of the fastener perforations 118 on the first tab 116 of the conduit 100 and/or the diameter of the fastener perforations 214 on the tabs 208 of the fiber optic cassette 200. Alternatively, the shelf fastener perforations 318 may have a slightly larger diameter than the fastener perforations 118, 214 of the conduit 100 and the cassette 200. For instance, the shelf fastener perforations 318 may have a diameter of 6.35-6.45 mm whereas the fastener perforations 118, 214 of the conduit 100 and cassette 200 may have a diameter of 6.04-6.15 mm. This slight discrepancy in diameter ideally accommodates a push-pin.

Each of the shelf fastener perforations 318 of the first and second pair 302, 306 of mounting rails 304 are regularly spaced apart from one another by a center-to-center spacing 320. The center-to-center spacing 320 may correspond to the width of the fiber optic cassette 200, so that individual fiber optic cassettes 200 can be mounted efficiently within the fiber optic shelf 300, with little or no wasted space between the cassettes 200. Alternatively, the center-to-center spacing 320 may be greater that the width of the fiber optic cassette 200, so that there is some room to maneuver the fiber optic cassettes 200.

Figure 6A:
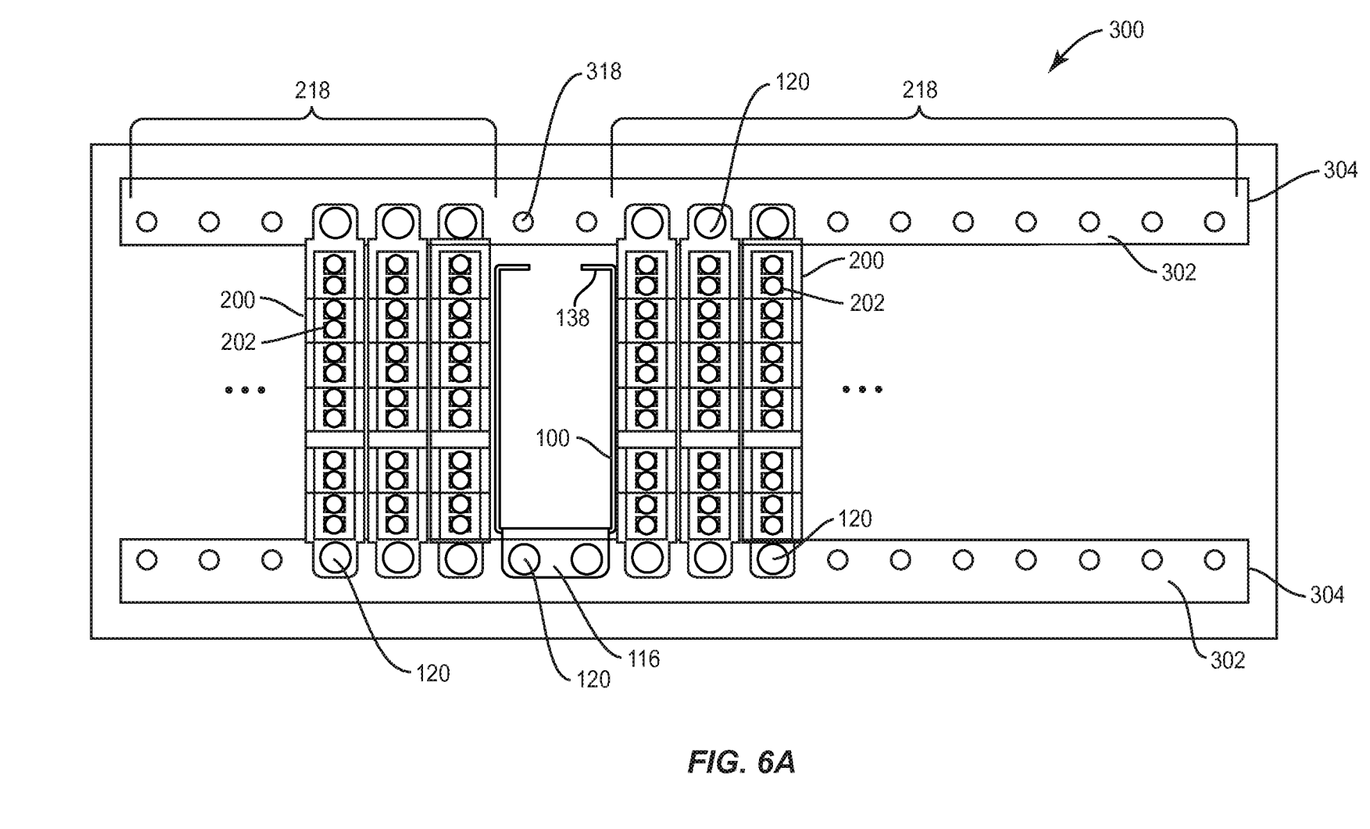
FIGS. 6A and 6B, depicts a conduit and fiber optic cassettes installed in a fiber optic shelf, according to an embodiment.
Figure 6B:
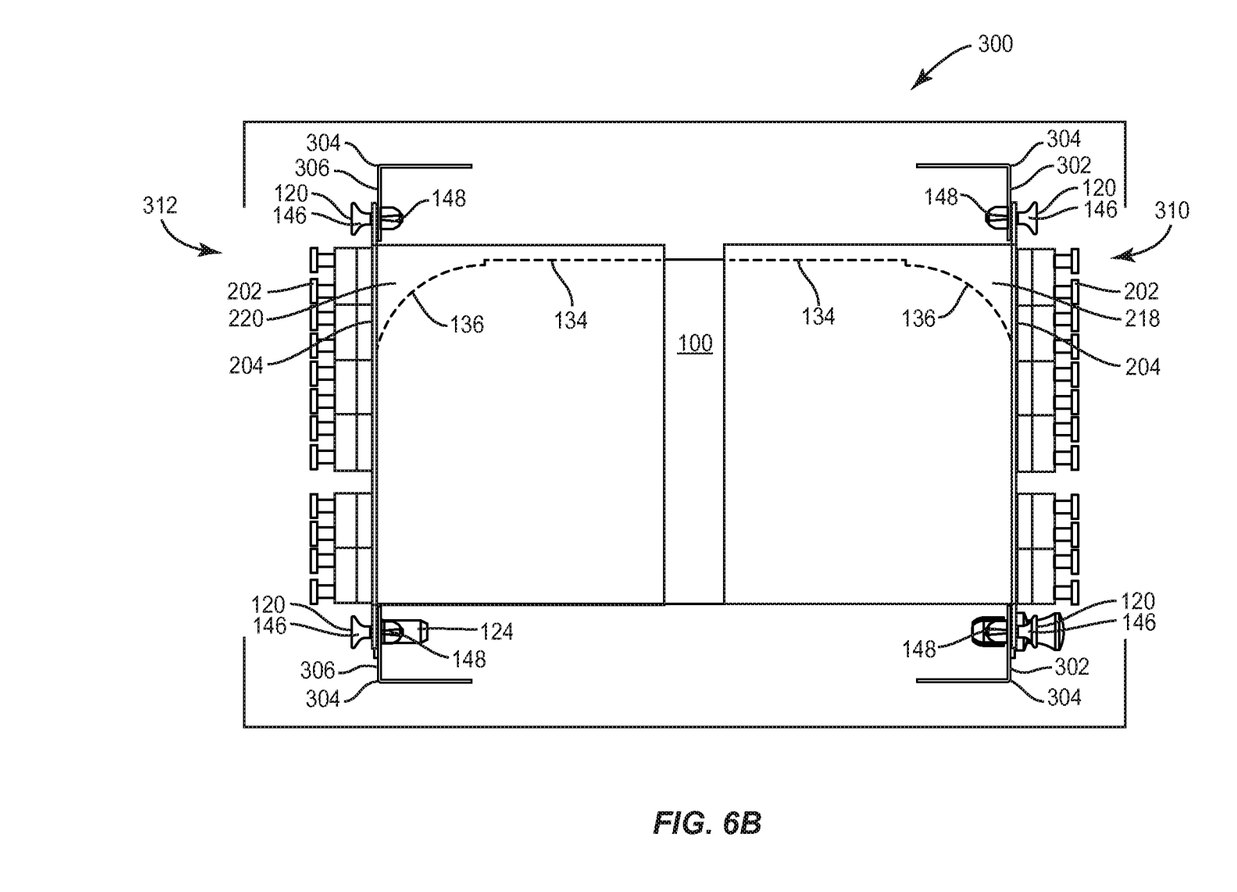

FIG. 6 depicts the fiber optic cassettes 200 and the conduit 100 installed in the fiber optic shelf 300. FIG. 6A is a front-view perspective and FIG. 6B is a side-view perspective. A first set 218 of fiber optic cassettes 200 is affixed to the mounting rails 304 in the first pair 302 by cassette fasteners 120 extending through the shelf fastener perforations 318. A second set 220 of fiber optic cassettes 200 is affixed to the mounting rails 304 of the second pair 306 by cassette fasteners 120 extending through the shelf fastener perforations 318. As a result, front sides 204 of the fiber optic cassettes 200 in the first set 218 face the first open side 310 of the shelf 300. Front sides 204 of the fiber optic cassettes 200 in the second set 220 face the second open side 312 of the shelf 300. Thus, all of the ports 202 of the respective fiber optic cassettes 200 are easily accessible by an installer and fiber optic terminations may be easily effectuated at both sides 310, 312 of the fiber optic shelf 300.

The conduit 100 is installed to the fiber optic shelf by cassette fasteners 120 inserted in the fastener perforations 118 of the first tab 116 and extending through the shelf fastener perforations 318 of a mounting rail 304 in the first pair 302 and by the protrusions 124 extending through shelf fastener perforations 318 of a mounting rail 304 in the second pair 306. Advantageously, the fastening anchor 114 and engagement anchor 122 are compatible with either of the mounting rails 304 in the first and second pair 302, 306 such that the orientation of the conduit 100 may be reversed. That is, the conduit 100 may be installed by cassette fasteners 120 inserted in the fastener perforations 118 of the first tab 116 and extending through the shelf fastener perforations 318 of a mounting rail 304 in the second pair 306. Alternatively the conduit 100 may be installed by the protrusions 128 extending through shelf fastener perforations 318 of a mounting rail 304 in the first pair 302.

The cassette fasteners 120 depicted in the illustrated embodiments are push-pins. In a push-pin assembly, a plunger 146 is arranged in a grommet 148. The push-pin has a contracted state in which the plunger 146 is pulled away from the grommet 148. In this contracted state, the grommet may be inserted into one of the shelf fastener perforations 318 so that the grommet 148 is completely arranged behind one the mounting rails 304, opposite the mounting surface 308. The push-pin forms a secure connection with the mounting rail 304 by pushing the plunger 146 into the grommet 148. This causes the grommet 148 to expand, thus providing counter-stabilization force against the back of the mounting rail 304. One example of a push-pin that may be used as a cassette fastener 120 is a NYLATCH Two-Piece Panel Fastener manufactured by Southco®.

If the cassette fastener 120 is a push-pin, the conduit 100 can only be installed to the shelf 300 by arranging the conduit 100 such that the grommet 148 can be inserted through one of the shelf fastener perforations 318. This requires freedom in movement of the conduit 100 with respect to the mounting rails 304. Thus, the conduit 100 may not be secured the mounting rails 304 in a manner that does not provide sufficient freedom in movement to allow for proper insertion and engagement of the push-pin mechanism. Further, it may not be possible to first secure the conduit 100 to a mounting rail 304 by a push-pin at the first end 106 and to then secure the second end 106 to an opposite facing mounting rail 304 by a push-pin. This is because a secured push-pin does not permit significant movement. Advantageously, the engagement anchor 122 of the conduit 100 is configured to permit the required degree of freedom in movement such that the conduit 100 may be affixed to a mounting rail 104 in each of the pairs 302, 306.

According to an embodiment, the protrusion 124 is dimensioned to be inserted into one of the shelf fastener perforations 318 of a mounting rail 304 in the second pair 306 such that the conduit 100 may be pivoted on the mounting rail 304 and moved towards and away from a mounting rail 304 in the first pair 302 so that a cassette fastener 120 may be inserted into one of the shelf fastener perforations 318 of a mounting rail 304 in the first pair 302 and secured to the mounting surface 308. That is, a diameter of the protrusion 124 is sufficiently smaller than the diameter of the shelf fastener perforation 318 is selected so that protrusion 124 can be slid in and out of the shelf fastener perforation 318 without substantial resistance 124. This sliding action permits the conduit 100 to have a degree of lateral freedom with respect to the mounting rails. Further, the floor 102 of the conduit 100 may be tilted while the protrusion 124 is extending through one of the of the shelf fastener perforations 318. Consequently, an installer may hook the protrusions 124 into one of the shelf fastener perforations 318 of a mounting rail 304 in the second pair 306 and manipulate the conduit 100 so that a push-pin arranged in the fastener perforation 118 of the first tab 116 can be secured in one of the shelf fastener perforations 318 of a mounting rail 304 in the first pair 302.

If the cassette fastener 120 is a push-pin assembly, the conduit 100 can be installed to the shelf according to the following procedure. First, the protrusion 124 is inserted into one of the shelf fastener perforations 318 of a mounting rail 304 in the second pair 306. At this time, the floor 102 of the conduit 100 is inclined with respect to the mounting rails 304 such that the floor 102 of the conduit 100 does not contact a mounting rail 304 in the first pair 302. Next, the conduit 100 is pivoted around the mounting rail 304 in the second pair 306 downward until the grommet 148 aligns with a shelf fastener perforation 318 of a mounting rail 304 in the first pair 302 and the floor 102 of the conduit 100 contacts mounting rail 304 in the first pair 302. Finally, the cassette fastener 120 is inserted into the shelf fastener perforation 318 and adjusted to secure the conduit 100 (i.e. by pushing the plunger 146 into the grommet 148). The cassette fastener 120 is inserted into the shelf fastener perforation 318 by sliding the conduit 100 with the cassette fastener 120 towards the mounting rail 304 in the second pair 306. Ideally, the diameter of the protrusion 124 should be sufficiently large enough to stabilize the conduit 100 with respect to the mounting rail 304 to which the protrusion 124 extends through but small enough to permit movement required for the above described fastening procedure.

According to the depicted embodiments, the conduit 100 comprises two cassette fastener perforations 118 and two protrusions 124. The fastener perforations 118 and protrusions 124 have a center-to-center spacing that corresponds to the center-to-center spacing 320 of the shelf fastener perforations 218. Thus, the conduit 100 may be secured to the shelf 300 by two cassette fasteners 120 secured to the first pair 302 of mounting rails 304 and by two protrusions 124 extending through the second pair 206 of mounting rails 304 (or vice-versa) in a similar manner as described above.

As shown in FIG. 6A, the conduit 100 provides a blank space between the fiber optic cassettes 200 that can be used for the routing of fiber optic cables. The lateral space occupied by the conduit 100 with respect to the mounting rails 304 may be exactly or substantially close to the space that would be occupied by a discrete number (e.g. 2) of fiber optic cassettes 200 mounted to the shelf 300. This is possible by dimensioning the conduit 100 such that a maximum width between the outer sides of the sidewalls 110 (i.e. the maximum separation distance 144 plus the thicknesses of the sidewalls 110) is substantially equal to a discrete number of fiber optic cassettes 200. According to an embodiment, a maximum width between the outer sides of the sidewalls 110 is 32.8 mm. In a system in which the fiber optic cassette 100 is approximately 15.2 mm wide and the center-to-center spacing 320 is approximately 16.4 mm, this dimensioning allows for the conduit 100 to occupy the horizontal space equivalent to two fiber optic cassettes 200, and for fiber optic cassettes 200 to be installed next to the fiber optic cassette 100 with little wasted space.

The conduit 100 can be widened or narrowed, depending upon the amount of space needed to route fiber optic cabling. Further, the number of cassette fastener perforations 118 and protrusions 124 can be correspondingly increased or decreased. That is, if a wider conduit space is required, the maximum separation distance 144 can be increased and the first tab 116 and engagement anchor 122 can be configured with three fastener perforations 118 and three protrusions 124, for example.

Figure 7:
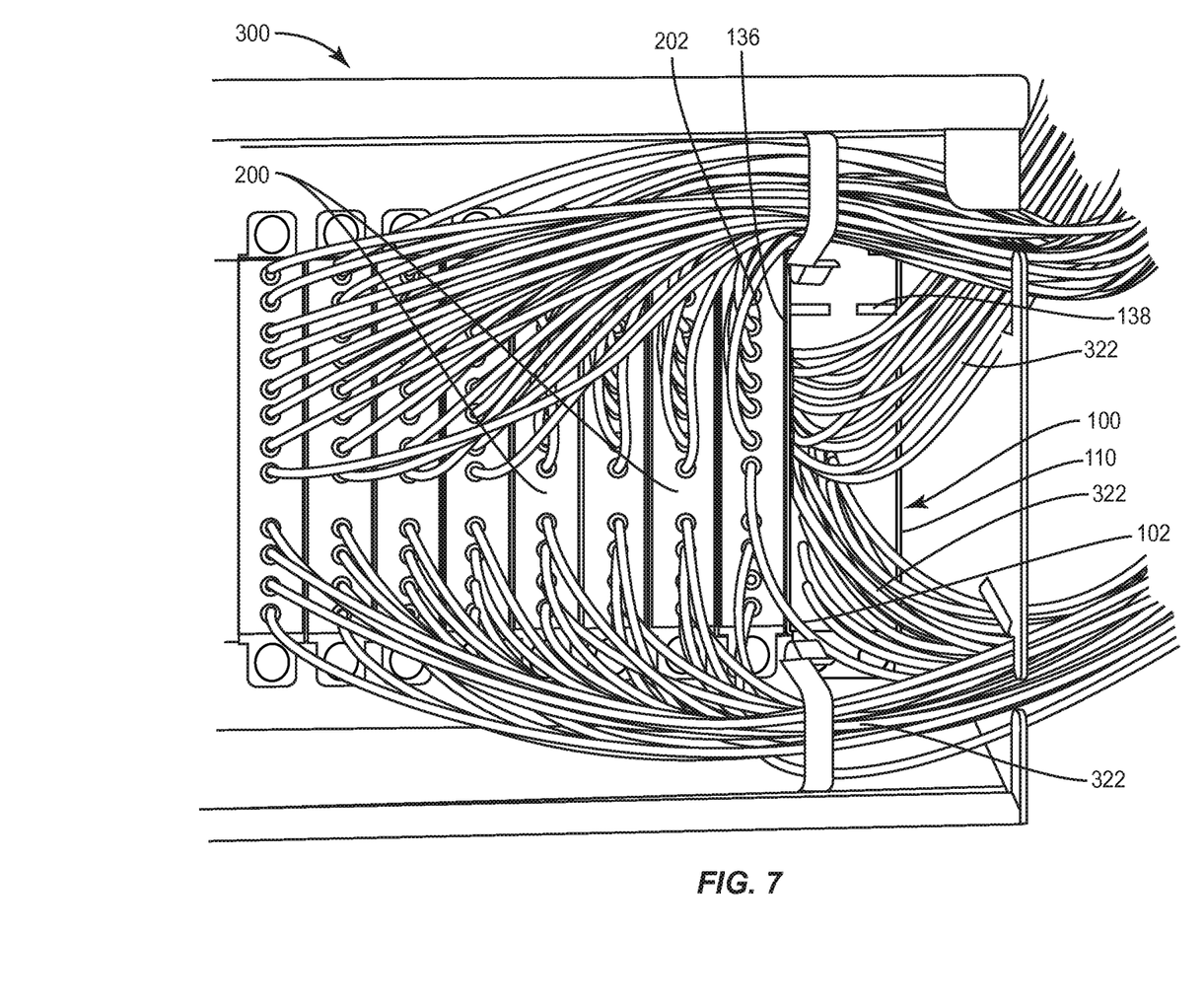
FIG. 7 depicts fiber optic cabling routed through a conduit that is installed to a fiber optic shelf, according to an embodiment.

FIG. 7 depicts the arrangement of FIG. 6 with optic cables 322 terminated at the ports 202 of the fiber optic cassettes 200 and routed through the conduit 100. The cables 322 are arranged between the sidewalls 110, the retaining features 138 and the floor 102. As can be seen, the conduit 100 allows for the efficient routing of fiber optic cables 322 through the shelf 300 (i.e. between the first and second set 218, 220 of fiber optic cassettes 200) by maintaining these fiber optic cables 322 within a defined space.

Advantageously, the retaining features 138 are arranged to allow for easy placement of the fiber optic cables 322 within the conduit space provided by the conduit 100 and to maintain the fiber optic cables 322 within the conduit 100 space thereafter. The retaining features 138 are sufficiently spaced apart such that an installer may easily place one or more fiber optic cables 322 between the retaining features 138. Thereafter, fiber optic cables 322 that are arranged in the conduit 100 along or near the sidewalls 110 cannot slide out of the conduit 100 due to the opposing plane 140 provided by the retaining features 138.

Advantageously, the curved edges 136 mitigate the possibility that fiber optic cables 322 will get caught along the perimeter 130 of the conduit 100. Accordingly, an installer can slide fiber optic cables 322 across the curved edges 136 while inserting or removing the cables 322 from the conduit space. The radius of curvature for the curved edges 136 may vary, provided that there is sufficient curvature to allow fiber optic cables 322 to easily slide along the curved edges 136 so that these fiber optic cables 322 do not get caught or become difficult to manipulate.

The dimensions of the fiber optic cassette 200 and/or the configuration of the shelf 300 may change, depending upon individual application requirements. For instance, fiber optic cassettes 200 may be configured to occupy two or more shelf fastener perforations 318 on a single mounting rail 304. That is, the the fiber optic cassettes 200 may have two or more fastener perforations 214 on each mounting tab 208 so that the fiber optic cassette 200 may be secured to the shelf 300 using four or more cassette fasteners 120. Further, the fiber optic cassettes 200 may be dimensioned to extend across the shelf such that the cassettes 200 are installed to both pairs 302, 206 of mounting rails 304. The conduit 100 as described herein may be used in any of these different configurations. The dimensional parameters of the conduit 100, such as the diameter of protrusions 124, length of the floor 102, height of the sidewalls 110, etc. may adjusted to meet the requirements of the shelf system.

Generally planar refers a surface that is not necessarily perfectly flat, and instead may slightly deviate from a singular plane. Although the generally planar surface of the conduit 100 disclosed herein may be manufactured to specifications requiring a perfectly or near-perfectly flat surface, process variation and warping due to temperature or installation may result in surfaces that are not perfectly flat. Provided that these surfaces are sufficiently planar to meet the requirements described herein (e.g. provide a U-shaped enclosure for the routing of fiber optic cables, occupy the space of two fiber optic cassettes, etc.), the surfaces are generally planar and encompass embodiments of the presently disclosed conduit 100.

Directional terminology, such as "top," "bottom," "front," "back," "upper," "lower," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The term "floor" is used to describe one side of the U-shaped enclosure and does not denote a beginning or an ending of the conduit 100. That is, different elements of the conduit 100 may be arranged on both sides of the floor 102.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A conduit for passing fiber optic cables through a fiber optic shelf, the conduit comprising:
    an elongated floor section;
    first and second generally planar sidewalls joining the floor section at opposite facing sides and extending away from the floor towards a top of the conduit, the first and second sidewalls and the floor section forming a u-shaped enclosure having an opening at the top;
    a fastening anchor comprising a first tab joining the floor section at a first end and extending away from the top to form a substantially perpendicular angle with the floor section, the first tab comprising a fastener perforation dimensioned to receive a fastener for affixing a fiber optic cassette to a fiber optic shelf; and an engagement anchor joining the floor section at a second end and extending away from the top, the engagement anchor comprising a protrusion extending towards the first tab so as to engage a fastener perforation of a mounting rail in the fiber optic shelf and secure the conduit to the mounting rail.

2. The conduit of claim 1, wherein the engagement anchor comprises a second tab joining the floor section at the second end and extending away from the top to form a substantially perpendicular angle with the floor section, and wherein the protrusion is arranged on the second tab and extends towards the mounting tab in a direction substantially parallel to the floor.

3. The conduit of claim 1, wherein the engagement anchor comprises a curved surface joining the floor section at the second end and curving towards the first tab, and wherein the protrusion is arranged at an end of the curved surface and extends towards the mounting tab in a direction substantially parallel to the floor.

4. The conduit of claim 1, wherein a perimeter of the first and second sidewalls comprises two side edges, two curved edges and a top edge, wherein the two side edges adjoin the floor and extend towards the top in a direction substantially perpendicular to the floor, wherein each one of the curved edges extends from one of the side edges to the top edge, and wherein the top edge extends between the curved edges along the top in a direction substantially parallel to the floor.

5. The conduit of claim 4, further comprising a pair of retaining features arranged on the first and second sidewalls opposite one another such that a separation distance between the pair of retaining features is less than a maximum separation distance between the first and second sidewalls.

6. The conduit of claim 5, wherein the retaining features comprise generally planar surfaces that are substantially parallel to the floor, the retaining features adjoining and extending along the entire top edge on the perimeter of the first and second sidewalls.

7. The conduit of claim 5, wherein each of the retaining features in the pair comprises a plurality of generally planar surfaces that are spaced apart from one another along a direction parallel to the floor, wherein each of the retaining features in the plurality are spaced apart from one another in a direction parallel to the top edge.

8. The conduit of claim 7, wherein each of the retaining features in the plurality extending away from the first sidewall is offset from each of the retaining features in the plurality extending away from the second sidewall in a direction parallel to the top edge.

9. The conduit of claim 5, wherein the separation distance between the retaining features is less than 50% of the maximum separation distance.

10. The conduit of claim 1, wherein the first tab comprises two of the fastener perforations, wherein the engagement anchor comprises two protrusions, and wherein a center-to-center spacing of the fastener perforations on the first tab is substantially equal to a center-to-center spacing of the protrusions.

11. The conduit of claim 1, wherein the first and second sidewalls form a substantially perpendicular angle with the floor section.

12. A system for mounting a plurality of fiber optic cassettes to a fiber optic shelf and for routing a plurality of fiber optic cables in the shelf between opposite facing fiber optic cassettes, the system comprising:
a fiber optic shelf, comprising:
   a first mounting rail arranged in the shelf such that a first planar mounting surface faces a first open side of the of the fiber optic shelf; and
   a second mounting rail arranged in the shelf spaced apart from the first mounting rail such that a second planar mounting surface faces a second open side of the fiber optic shelf that is opposite the first opening;
   wherein the first and second planar mounting surfaces each comprise an array of shelf fastener perforations being dimensioned to receive a cassette fastener for affixing a fiber optic cassette against the mounting surface; and
a conduit, comprising:
   an elongated floor section;
   first and second generally planar sidewalls joining the floor section at opposite facing sides and extending away from the floor towards a top of the conduit, the first and second sidewalls and the floor section forming a u-shaped enclosure having an opening at the top;
   a fastening anchor comprising a first tab joining the floor section at a first end and extending away from the top to form a substantially perpendicular angle with the floor section, the first tab comprising a fastener perforation dimensioned to receive a fastener for affixing the conduit to a fiber optic shelf; and
   an engagement anchor joining the floor section at a second end and extending away from the top, the engagement anchor comprising a protrusion extending towards the first tab so as to engage a fastener perforation of a mounting rail in the fiber optic shelf and secure the conduit to the mounting rail.

13. The system of claim 12, further comprising a cassette fastener inserted in the fastener perforation of the first tab, wherein the protrusion on the engagement anchor is dimensioned to be inserted into one of the shelf fastener perforations of the second mounting rail such that the conduit may be pivoted on the second mounting rail and moved towards and away from the first mounting rail so that the cassette fastener may be inserted into one of the shelf fastener perforations of the first mounting rail and secured to the mounting surface of the first mounting rail.

14. The system of claim 13, wherein the conduit is secured to the fiber optic shelf by a push-pin extending through one of the shelf fastener perforations of the first mounting rail and by the protrusion extending through one of the shelf fastener perforations of the second mounting rail.

15. The system of claim 14, further comprising:
a first set of fiber optic cassettes affixed to the first mounting rail by push-pins inserted through the shelf fastener perforations of the first mounting rail;
a second set of fiber optic cassettes affixed to the second mounting rail by push-pins inserted through the shelf fastener perforations of the second mounting rail; and
a plurality of fiber optic cables arranged in the conduit between the first and second sidewalls.

16. The system of claim 15, wherein the conduit comprises a pair of retaining features arranged on the first and second sidewalls opposite one another such that a separation distance between the retaining features is less than a maximum separation distance between the first and second sidewalls, and wherein the plurality of fiber optic cables is arranged between the sidewalls, the pair of retaining features and the floor section.

17. The system of claim 12, wherein the shelf fastener perforations on the first and second rail are regularly spaced apart from one another by a center-to-center spacing, wherein the first tab comprises two fastener perforations spaced apart from one another by the center-to-center spacing, and wherein the engagement anchor comprises two protrusions spaced apart from one another by the center-to-center spacing.

* * * * *